United States Patent [19]

Hummel

[11] 3,890,009
[45] June 17, 1975

[54] EASY OFF WHEEL RETAINER

[76] Inventor: Thomas Hummel, 230 Mulberry Dr., Glenwood, Ill. 60425

[22] Filed: Oct. 3, 1973

[21] Appl. No.: 408,081

[52] U.S. Cl. .................. 301/9 DN; 24/212; 292/54; 292/210
[51] Int. Cl. ............................................. B60b 3/14
[58] Field of Search ........... 301/119, 120, 121, 111, 301/5 R, 65, 6 W, 9 DN; 24/212, 221 R, 97, 99; 248/361 B; 292/114, 44, 54, 210, 304

[56] References Cited
UNITED STATES PATENTS

| 2,484,447 | 10/1949 | Cass | 301/9 DN |
| 2,671,694 | 3/1954 | Adams | 24/221 R |

FOREIGN PATENTS OR APPLICATIONS

| 843,929 | 8/1960 | United Kingdom | 24/212 |

*Primary Examiner*—M. Henson Wood, Jr.
*Assistant Examiner*—Reinhard J. Eisenzopf
*Attorney, Agent, or Firm*—Richard J. Myers

[57] ABSTRACT

A construction for easily and quickly mounting and securing an automobile wheel to a brake drum of an automotive vehicle, and to the axle thereof. The retainers comprise hinged devices that extend through holes in the supporting web portion of the wheel between the hub and the rim, the retainers being attached to each wheel brake drum and thereby secured to the axle, replacing the usual threaded studs, so that after a wheel is positioned over the retainers, the retainers are swung to the closed position and securely clamped.

6 Claims, 4 Drawing Figures

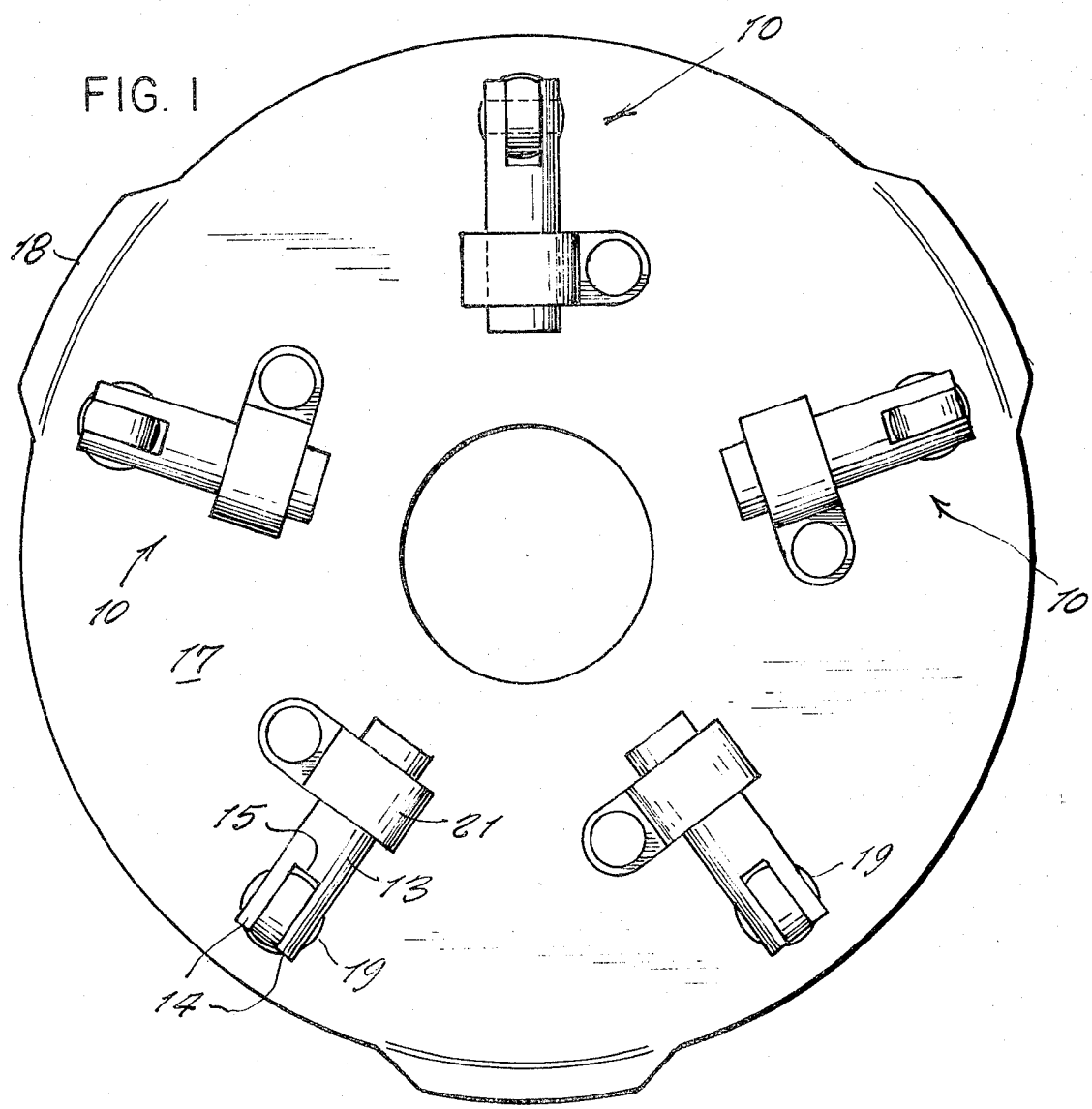
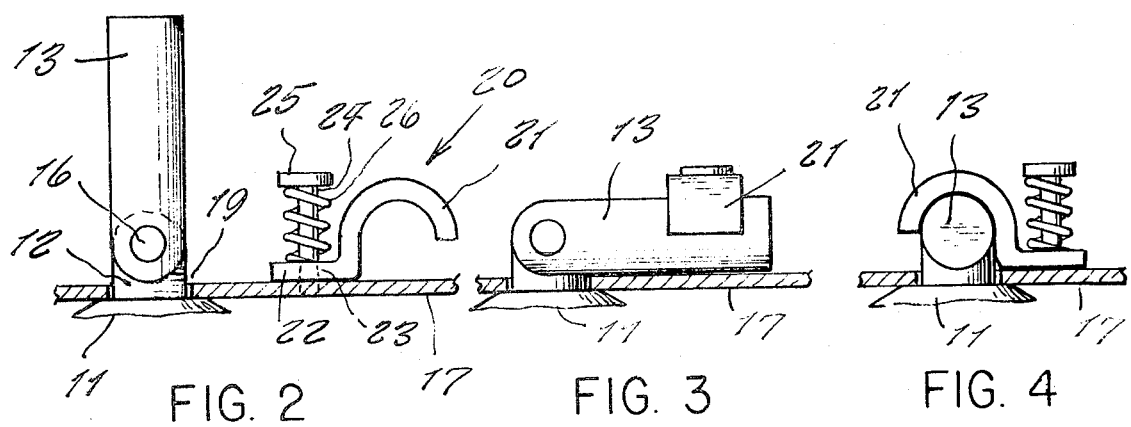

EASY OFF WHEEL RETAINER

This invention relates generally to automotive vehicles. More specifically it relates to wheel retaining devices.

It is generally well known to most motorists that removing and mounting automotive wheels with threaded fasteners is a slow and difficult task.

Accordingly the principal object of the present invention is to provide an easy off wheel retainer that is designed to eliminate the cumbersome task of removing lug nuts from wheels in order to change tires.

Another object of the present invention is to provide an easy off wheel retainer which will take the place of lugs and lug nuts of automobiles wheels.

Still another object of the present invention is to provide an easy off wheel retainer which is quick and easy to use in clamping on or clamping off a wheel.

Other objects of the present invention are to provide an easy off wheel retainer which is simple in design, inexpensive to manufacture, rugged in construction, easy to use and efficient in operation.

These and other objects will be readily evident upon a study of the following specification and the accompany drawing wherein:

FIG. 1 is a side elevation view of the present invention shown in a locked position;

FIG. 2 is a edge elevation view of one of the retainers in an opened position;

FIG. 3 is a similar view thereof shown in a locked position;

FIG. 4 is an end view thereof.

Reference is now made to the drawing in detail, wherein the reference numeral 10 represents an easy off wheel retainer according to the present invention and wherein the same are attached to the brake drum and axle terminally thus replacing the usual threaded studs.

In the present invention, a series of easy off wheel retainers 10 are arranged in a concentric circle and are concentric with the central axis of the brake drum and axle. As shown in FIG. 1, such brake drum 11 may preferablly have four or five of such retainers to be the same in number as the conventional threaded studs presently being used. Each of the retainers 10 includes a lug 12 that is integral with the brake drum 11 and protrudes from the face of the brake drum. A cylindrical shaped retainer member 13 is bifurcated at one end as shown at 14 with a space 15 therebetween for placement of the lug 12. The lug and bifurcated end of the retainer member 13 are then pivotally secured together by means of a transverse pin 16.

In the present invention, a supporting web 17 forms a portion of a conventional automobile wheel. The web includes peripherally extending tabs 18 which are welded to the wheel rim inner periphery. The supporting web 17 is provided with a series of openings 19 therethrough, the openings 19 being arranged in a concentric circle in order that the retainer members 13 when extending straight outwardly may to be fitted through the openings 19. Attached to the outer side of the supporting web 17 there are a series of hold down clamps 20 arranged in a concentric circle and which are positioned so that when the retainer member 13 is pivoted from the extended position shown in FIG. 2 to the position shown in FIG. 3 wherein the retainer member is adjacent to the outer side of the supporting web, then the holding clamp will prevent the retainer member from accidentally pivoting into the extended position so that the supporting web of the wheel is firmly secured to the brake drum and axle. The securing clamp 20 includes U-shaped clamp member 21 having an extension 22 at one end thereof, and opening 23 through the extension so that the clamp member 21 is slideably fitted upon a pin 14 rigidly secured at one end to the supporting web, the opposite end of the pin having an enlarged head 25. A compression coiled spring 26 bears at one end against the underside of the head 26, the opposite end of the spring bearing against the extension 23 of the clamp member, so that normally the clamp member is urged against the supporting web and accordingly thus holding the retainer member in adjacent position to the supporting web.

In operative use, it is now evident that the automotive wheel can be quickly and easily thus changed by simply unsnapping the retainer members 13 from under the clamp members 13 so that the retainer numbers 13 then extend straight outwardly from the supporting web. Then the wheel is simply removed and another wheel is then slipped over the retainer members 13 after which the retainer members are pivoted downwardly so to be clamped under the clamp members 21. Thus a quicker and easier method is provided for changing wheels that is superior to the conventional use of wheel lug nuts.

What I now claim is:

1. An easy off wheel retainer construction fixedly securing a wheel to a supporting automotive vehicle axle, the combination of a plurality of retainer means being mounted in an annular arrangement upon the end of a brake drum, said arrangement of retainer means being generally concentric with the central axis of said brake drum and the axle of the automotive vehicle, and, each of said retainer means including a lug secured to and projecting outwardly from said brake drum and a retainer member being pivotally attached to the end of said lug, said wheel including an outer rim and a wheel web extendable over each of said retainer members and lugs adjacent said brake drum, clamp means associated with each retainer means and mounted on said web whereby said clamp means is movable around said associated pivotal retainer member for holding same against the web to hold the wheel web on the brake drum.

2. The invention according to claim 1, and
    said clamp means being resiliently mounted on said web.

3. The invention according to claim 1, and
    said plurality of retainer means being mounted in a circular path on the outside of said brake drum.

4. The invention according to claim 1, and
    each of said clamp means being arranged generally in a circle on said wheel web.

5. The invention according to claim 1, and
    said plurality of retainer means being mounted in a circular path on the outside of said brake drum,
    each of said clamp means being arranged generally in a circle on said wheel web.

6. The invention according to claim 1, and
    said wheel web being permanently welded to the inner periphery of the rim of said wheel.

* * * * *